US011151187B2

(12) United States Patent
Koenig

(10) Patent No.: US 11,151,187 B2
(45) Date of Patent: Oct. 19, 2021

(54) PROCESS TO PROVIDE AUDIO/VIDEO/LITERATURE FILES AND/OR EVENTS/ACTIVITIES, BASED UPON AN EMOJI OR ICON ASSOCIATED TO A PERSONAL FEELING

(71) Applicant: Eric Koenig, Huntington, NY (US)

(72) Inventor: Eric Koenig, Huntington, NY (US)

( * ) Notice: Subject to any disclaimer, the term of this patent is extended or adjusted under 35 U.S.C. 154(b) by 0 days.

(21) Appl. No.: 16/297,019

(22) Filed: Mar. 8, 2019

(65) Prior Publication Data
US 2019/0205328 A1    Jul. 4, 2019

Related U.S. Application Data

(63) Continuation of application No. 15/214,436, filed on Jul. 19, 2016, now abandoned.

(51) Int. Cl.
| | |
|---|---|
| *G06F 16/435* | (2019.01) |
| *G06F 3/0482* | (2013.01) |
| *H04L 29/08* | (2006.01) |
| *G06F 16/638* | (2019.01) |
| *G06F 16/68* | (2019.01) |
| *G06F 16/632* | (2019.01) |

(52) U.S. Cl.
CPC .......... *G06F 16/435* (2019.01); *G06F 16/632* (2019.01); *G06F 16/639* (2019.01); *G06F 16/686* (2019.01); *H04L 67/04* (2013.01); *H04L 67/125* (2013.01); *H04L 67/306* (2013.01); *G06F 3/0482* (2013.01)

(58) Field of Classification Search
CPC .... G06F 16/435; G06F 16/686; G06F 16/632; G06F 16/639; G06F 3/0481; G06F 3/04817; G06F 3/0487; G06F 3/0482; G06F 3/0484; G06F 3/04842; H04L 67/04; H04L 67/125; H04L 67/306
See application file for complete search history.

(56) References Cited

U.S. PATENT DOCUMENTS

| | | | | |
|---|---|---|---|---|
| 2006/0041848 | A1* | 2/2006 | Lira | ..................... G06Q 10/107 715/805 |
| 2006/0236847 | A1* | 10/2006 | Withop | .................. G06F 16/44 84/612 |
| 2007/0037590 | A1* | 2/2007 | Lee | ................... H04M 1/72427 455/466 |
| 2010/0011388 | A1* | 1/2010 | Bull | ................. H04N 21/42201 725/9 |
| 2012/0059787 | A1* | 3/2012 | Brown | .................... G06F 40/30 706/52 |

(Continued)

OTHER PUBLICATIONS

Lehtiniemi et al., "Evaluating MoodPic—a Concept for Collaborative Mood Music Playlist Creation," 2013 17th International Conference on Information Visualisation, London, 2013, pp. 86-95. (Year: 2013).*

*Primary Examiner* — Kavita Stanley
*Assistant Examiner* — William Wong
(74) *Attorney, Agent, or Firm* — Georgiy L. Khayet

(57) ABSTRACT

The current invention is a recommendation system that translates a user's mood into activities and/or files (music, video, and/or literature) that are personalized. The user selects an icon, emoticon, or emoji, that represents their desired mood and the system matches files and/or events and activities to that desired mood, personalized to each user.

20 Claims, 17 Drawing Sheets

(56) References Cited

U.S. PATENT DOCUMENTS

| | | | | |
|---|---|---|---|---|
| 2012/0162350 A1* | 6/2012 | Lee | H04L 51/10 |
| | | | 348/14.03 |
| 2012/0179757 A1* | 7/2012 | Jones | G06Q 50/01 |
| | | | 709/204 |
| 2014/0164507 A1* | 6/2014 | Tesch | H04L 51/10 |
| | | | 709/204 |
| 2014/0298364 A1* | 10/2014 | Stepanov | H04N 21/4758 |
| | | | 725/10 |
| 2015/0222586 A1* | 8/2015 | Ebersman | G06F 3/04817 |
| | | | 715/752 |
| 2015/0324858 A1* | 11/2015 | DeMattei | H04L 51/08 |
| | | | 705/14.64 |
| 2016/0006679 A1* | 1/2016 | Williams | H04L 12/1859 |
| | | | 455/466 |
| 2016/0048589 A1* | 2/2016 | Modi | G06Q 30/02 |
| | | | 463/25 |
| 2016/0259502 A1* | 9/2016 | Parrott | G06F 3/04817 |
| 2017/0093785 A1* | 3/2017 | Kii | G06Q 10/107 |

* cited by examiner

PROCESS TO PROVIDE AUDIO/VIDEO/LITERATURE FILES AND/OR EVENTS/ACTIVITIES, BASED UPON AN EMOJI OR ICON ASSOCIATED TO A PERSONAL FEELING

CROSS-REFERENCES TO RELATED APPLICATIONS

The present application is a continuation of U.S. patent application Ser. No. 15/214,436, titled "Process to provide audio/video/literature files and/or events/activities, based upon an emoji or icon associated to a personal feeling," filed Jul. 19, 2016. The subject matter of the aforementioned application is incorporated herein by reference for all purposes.

BACKGROUND

1. Field of the Invention

The present invention relates to a process to recommend audio/video/literature files and/or events/activities, more particularly associating these recommendations to a personal feeling that has been paired with an emoji or icon.

2. Description of Prior Art

U.S. Pat. No. 8,255,810 by Moore, et al. and issued on Aug. 28, 2012 is for a portable touch screen device, method, and graphical user interface for using emoji characters while in a locked mode. It discloses a computer-implemented method performed at a portable electronic device with a touch screen display includes simultaneously displaying a character input area operable to display text character input and emoji character input selected by a user, a keyboard display area, and a plurality of emoji category icons. In response to detecting a gesture on a respective emoji category icon, the method also includes simultaneously displaying: a first subset of emoji character keys for the respective emoji category in the keyboard display area and a plurality of subset-sequence-indicia icons for the respective emoji category. The method also includes detecting a gesture in the keyboard display area and, in response: replacing display of the first subset of emoji character keys with display of a second subset of emoji character keys for the respective emoji category, and updating the information provided by the subset-sequence-indicia icons.

U.S. Pat. No. 8,918,339 Issued Dec. 23, 2014/United States Patent Application 20140279418 by Yigal Rubinstein, et al. and published on Sep. 18, 2014 is for ASSOCIATING AN INDICATION OF USER EMOTIONAL REACTION WITH CONTENT ITEMS PRESENTED BY A SOCIAL NETWORKING SYSTEM. It discloses a social networking system user may associate an emoji representing the user's emotional reaction with a content item presented by the social networking system. The user is presented with one or more emoji maintained by the social networking system and selects an emoji for associating with the content item. If certain emoji are selected, the social networking system prompts the user for compensation or requests compensation from an entity associated with the selected emoji. The selected emoji is associated with the content item and a connection, or other information, between the user and the object identifying the selected emoji is stored by the social, networking system. The selected emoji may be displayed with the content item to the user and to other users connected to the user.

United States Patent Application 20160092937 by Steven Martin and filed on Mar. 31, 2016 for a selectable Text Messaging Styles for Brand Owners. It discloses a system includes a computing device that includes a memory configured to store instructions. The system also includes a processor to execute the instructions to perform operations that include sending information to a publisher that represents one or more immutable stylistic features for enhancing text messages. Operations also include sending information to the publisher that represents one or more conditions regarding the use of the one or more immutable stylistic features in text messages that include mutable content. Operations also include receiving feedback information in response to the stylistic features being used in one or more text messages that include mutable content.

United States Patent Application 20160142362 by Ana Fitzner and filed on May 19, 2016 is for CUSTOM ENCODED MESSAGES AMONGST A CUSTOMIZED SOCIAL GROUP. It discloses a system and method for sending custom encoded messages amongst a customized social group. A selection of intended recipients within a subgroup from a list of contacts is received on a client device. It is determined whether all of the selected recipients are capable of receiving a custom encoded message. If it is negative, the method includes sending an invitation email to one or more of the selected recipients. If it is affirmative: the method includes receiving a message from the user intended for the selected recipient. An assignment of a graphical symbol to an alphabet is received from the user. The assignment associating with all of the intended recipients is stored in a memory of the client device. The assignment and the message are transmitted to a remote processor for converting the message to the custom encoded message based on the assignment and transmitting them to the device.

United States Patent Application 20150341304 by Corinne Elizabeth Sherman; et al. and published on Nov. 26, 2015 is for a PERSONALIZED SHARING AT THE USER LEVEL. It discloses a system comprising a computer-readable storage medium storing at least one program and a computer-implemented method for generating and provisioning personalized messages is presented. Consistent with some embodiments, the method may include receiving a request from a user to share content with one or more other users. In response to receiving the request, user profile data about the user may be accessed, and a portion of the user profile data may be selected. The method may further include generating a personalized message based on the selected portion of the user profile data, and communicating the personalized message to the one or more other users. It is assigned to EBAY INC.

United States Patent Application 20150334529 by Neilesh JAIN et al. and published on Nov. 19, 2015 for SHARING MOMENT EXPERIENCES. It discloses a system for sharing moment experiences is described. A system receives moment data from an input to a mobile device. The system receives geographic location information, time information, and contextual information that is local to the mobile device. The system creates a message about the moment data based on the geographic location information, the time information, and the contextual information. The system outputs the moment data with the message.

United States Patent Application 20150222586 by David Ebersman et al. published on Aug. 6, 2015 is for an ideograms Based on Sentiment Analysis. It discloses particular embodiments of a method comprise analyzing a message to perform sentiment analysis with respect to at least a portion of the message. One or more sentiments associated with the at least a portion of the message may then be identified. One or more ideograms (e.g., written characters, symbols or images that represent an idea or thing), each corresponding to an identified sentiment, may then be suggested to a user for insertion into a message. Upon receiving a user selection of one or more of the ideograms in relation to some portion of the message, an association may be saved in a user-specific dictionary linking the user-selected one or more of the ideograms with the portion of the message. In particular embodiments, the sentiment analysis may incorporate social-networking information and/or historical ideogram usage information.

United States Patent Application 20150100537 by Jason Grieves; et al. and published on Apr. 9, 2015 is for emoji for Text Predictions. If discloses techniques to employ emoji for text predictions are described herein. In one or more implementations, entry of characters is detected during interaction with a device. Prediction candidates corresponding to the detected characters are generated according to a language model that is configured to consider emoji along with words and phrases. The language model may make use of a mapping table that maps a plurality of emoji to corresponding words. The mapping table enables a text prediction engine to offer the emoji as alternatives for matching words. In addition or alternatively, the text prediction engine may be configured to analyze emoji as words within the model and generate probabilities and candidate rankings for predictions that include both emoji and words. User-specific emoji use may also be learned by monitoring a user's typing activity to adapt predictions to the user's particular usage of emoji.

There is still room for improvement in the art.

SUMMARY OF THE INVENTION

The current invention is a recommendation system that translates a user's mood into activities and/or files (music, video, and/or literature) that are personalized. The user selects an icon, emoticon, or emoji, that represents their desired mood (hereinafter referred to as an Emoodji) and the system snatches files and/or events and activities to that desired mood, personalized to each user.

The system also provides for a means to exchange these mood-themed files and activities as a form of "slang" language—enabling users to share music, video, literature, events, and activities through images instead of actual text.

The process has the following steps:

1. Profile Creation: The user first enters some basic profile information, then they choose their desired mood icons (i.e. Emoodjis) from a series of preloaded icon options, and finally they set their preferred genres for each mood (i.e. which genres help them to feel those selected moods)—for example, regarding music, the user has entered into the requisite data entry field or selected from available preloaded options, for example, that Pop, Dance, and Hip Hop make that user feel Happy, so when that user selects the "Happy" Emoodji (i.e. the Emoodji that user associated with the mood of being happy), the app plays those music genres.

2. Music/Video/Literature/Event Generation: Once the user has created a profile, the software will provide music/video/literature files (or multi-media content) or an event to the user, based upon the selected Emoodji and the corresponding genres—for example, if Pop, Dance, and Hip Hop make the user feel Happy, the app will provide music that matches those music genres, or if Hiking, Camping, and Rafting make the user feel Adventurous, the app will provide suggestions on things to do that match those activities.

3. Music/Video/Literature/Event Editing: In some embodiments, the user can edit the track that is provided to them via the system by adding additional instrumentation, vocals, sound bites, video clip, etc. The user can also edit the recommended literature file by adding content of their own choosing. They can similarly add extra activities to an event suggestion made by the app.

4. Sharing/Collaboration: Users can send each other Emoodjis in the same fashion they sent traditional emojis—as a graphic representation of a mood, but one that triggers multi-media media content to play or literature to be displayed when clicked by the recipient, or asks the recipient to schedule or confirm an event.

The innovative process is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

The current invention is a recommendation system 1 that translates a user's mood into activities and/or files (music, video, and/or literature) that are personalized. The user selects an icon, emoticon, or emoji, that represents their desired mood (i.e. Emoodji) and the system matches files and/or events and activities to that desired mood, personalized to each user. The system also provides for a means to exchange these mood-themed files as a form of "slang" language—enabling users to share music, video, literature, events, and activities through images instead of actual text.

Figure 1:
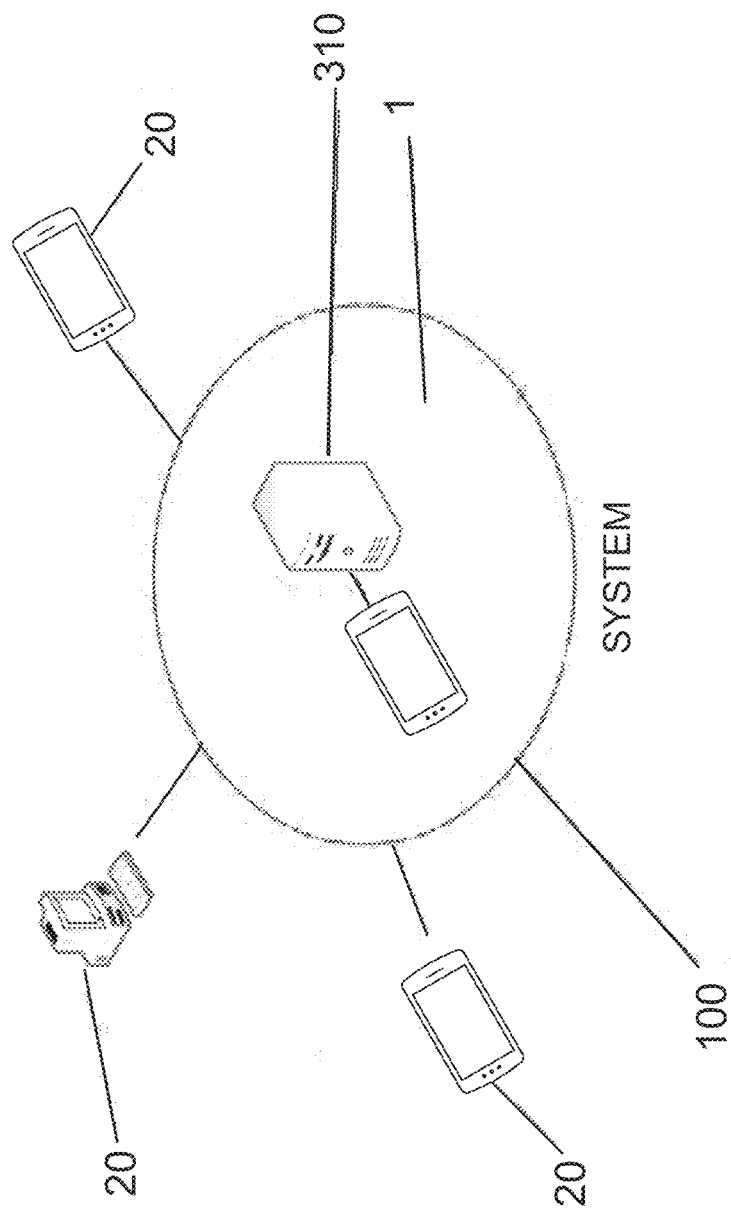
FIG. 1 shows an overview of how users access the system.

FIG. 1 displays the preferred embodiment of the system architecture 1 accessed through an Internet, Intranet and/or Wireless network 500. However, the system could be implemented on a device-to-device or client/server architecture as well.

In FIG. 1, the system 1 is accessed from a user's computing device 10 through a web browser over HTTP and/or HTTPS protocols 500 or wireless network or cell phone to cell phone connection. A computing device 20, such as a cell phone, that can access the system 1 must have some version of a CPU, CPU memory, local hard disk, keyboard/keypad/input and display unit. The computing device 20 can be any desktop, laptop, tablet, smart phone or general purpose computing device with an appropriate amount of memory suitable for this purpose and an active connection to the Internet 500. Computing devices like this are well known in the art and are not pertinent to the invention.

The system 1, data and processing code can reside in the non-transitory memory 310 of the one or more computing devices. The system 1 in the preferred embodiment would be written to act like a smart phone application (app).

In one embodiment, the process has the following steps:

1. Profile Creation: The user first enters some basic profile information, then they choose their desired mood icons 200 (i.e. Emoodjis) from a series of preloaded icon options, and finally they set their preferred genres for each mood (i.e. which music, video, literature, and/or activity genres help them to feel those selected moods)—for example, Pop, Dance, and Hip Hop make the user feel Happy, so when the user selects the happy Emoodji, the app plays those music/video genres, or Hiking, Camping, and Rafting make the user feel Adventurous, so when the user selects the Adventurous Emoodji, the app provides suggestions on things to do that match those activity genres.

2. Music/Video/Literature/Event Generation: Once the user 10 has created a profile, the app will provide music/video/literature/event files to the user, based upon the selected Emoodji 200 and the corresponding genres—for example, if Pop, Dance, and Hip Hop make the user feel Happy, the app will provide music that matches those music/video genres.

3. Music/Video/Literature/Event Editing: In some embodiments, the user can edit the track that is provided to them via the system by adding additional instrumentation, vocals, sound bites, video clip, etc. The user can also edit the recommended literature file by adding content of their own choosing. They can similarly add extra activities to an event suggestion made by the app.

4. Sharing/Collaboration: Users 10 can send each other Emoodjis in the same fashion they sent traditional emojis— as a graphic representation of a mood, but one that triggers multi-media content to play when clicked or literature to be displayed when clicked by the recipient, or asks the recipient to schedule or confirm an event.

The process is defined in more detail below.

Profile Creation

Figure 2:
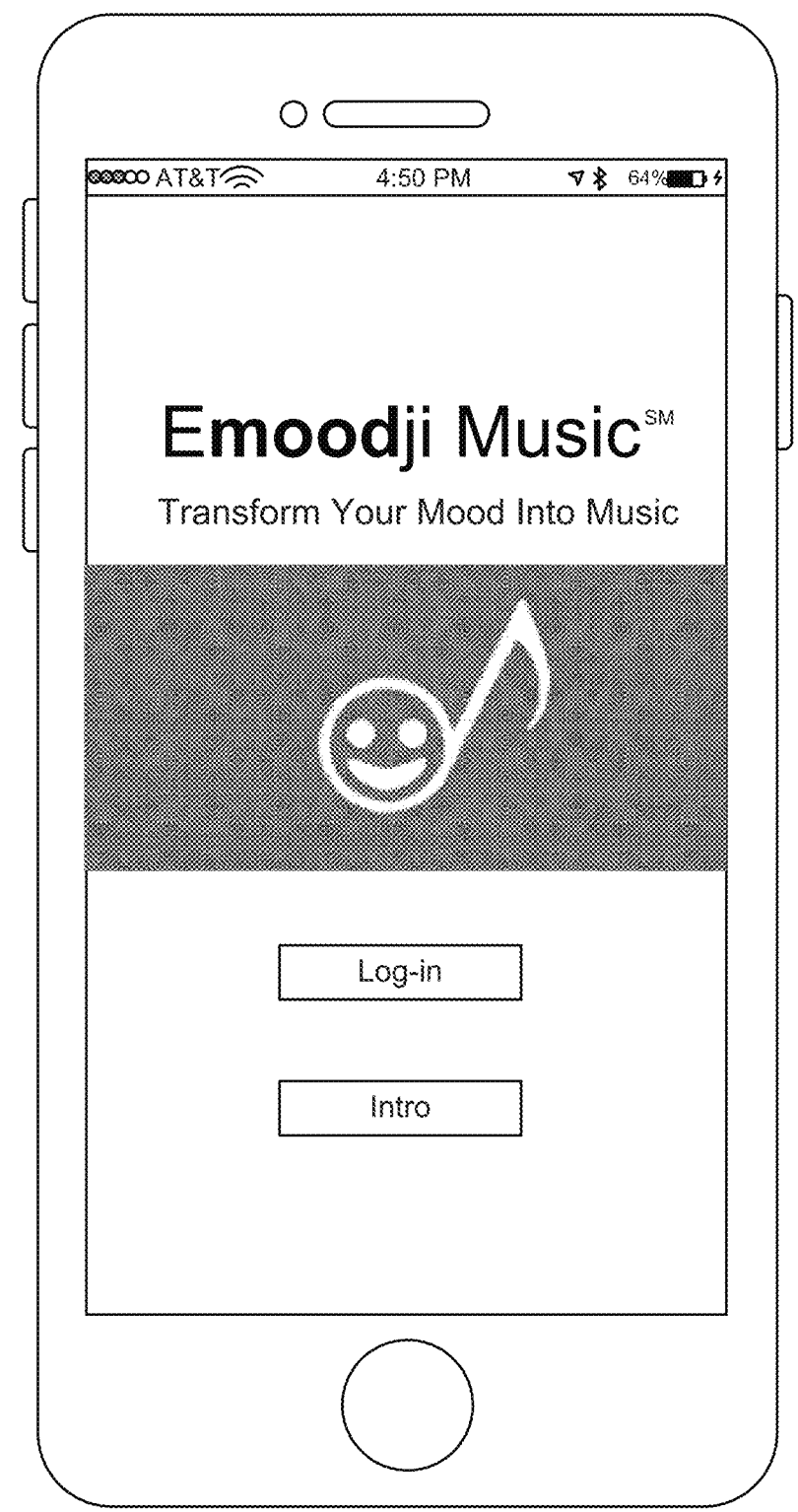
FIG. 2 shows a sample of a login screen.

The first step in the current invention process is the creation of a personalized user account (i.e. profile) that will be utilized to provide the user 10 with the most relevant music/video/literature/activity options:

1. After the user downloads the data that contains the system data and execution files, the user will see a Welcome screen with an introduction, outlining the uses of the app— its features and functionality as shown in FIG. 2.

Figure 3:
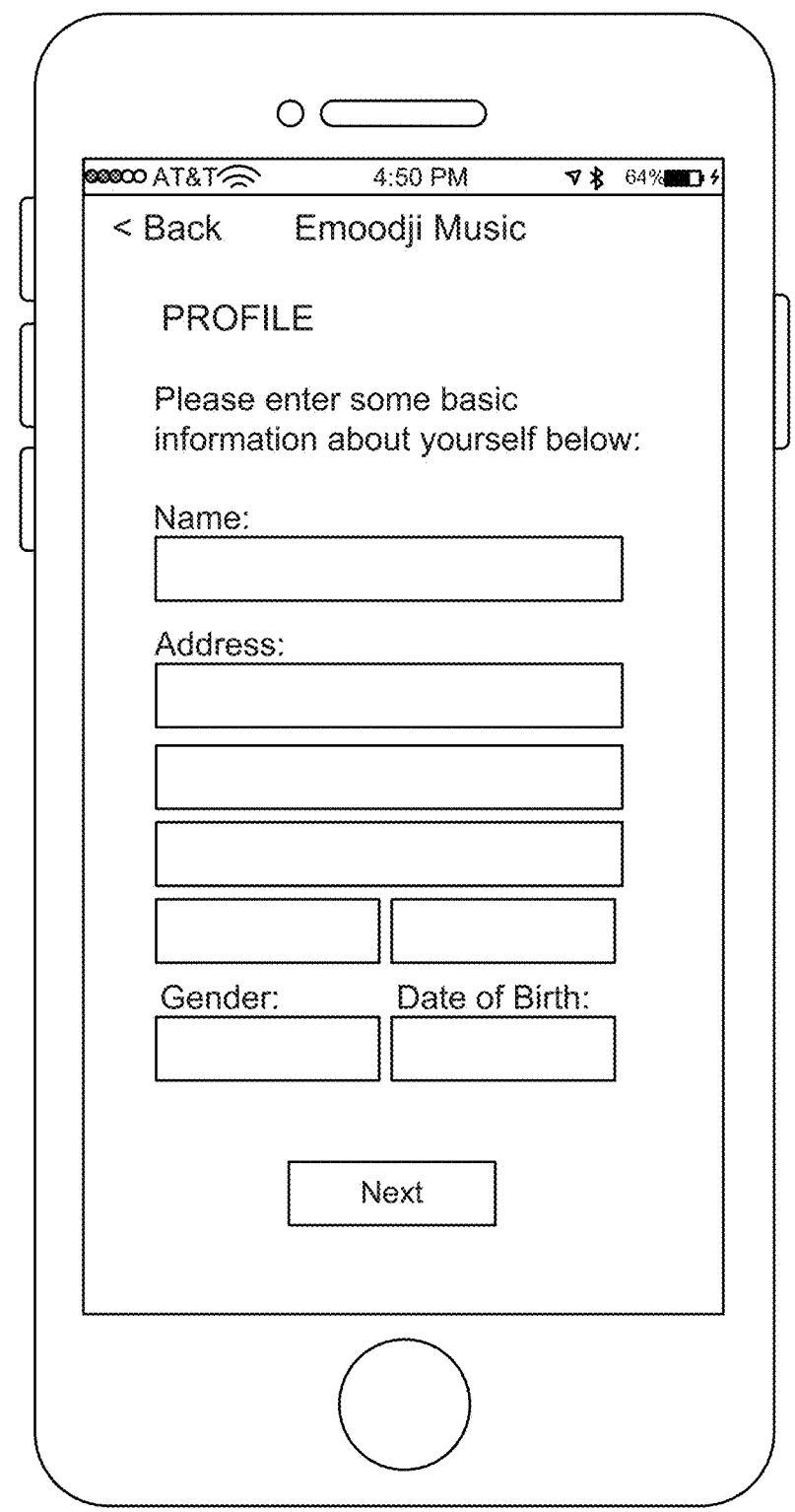
FIG. 3 shows a sample of a profile screen.

2. Then, they will be directed to enter their personal data (for example, name, age, gender, address, etc.) as shown in FIG. 3.

Figure 4:
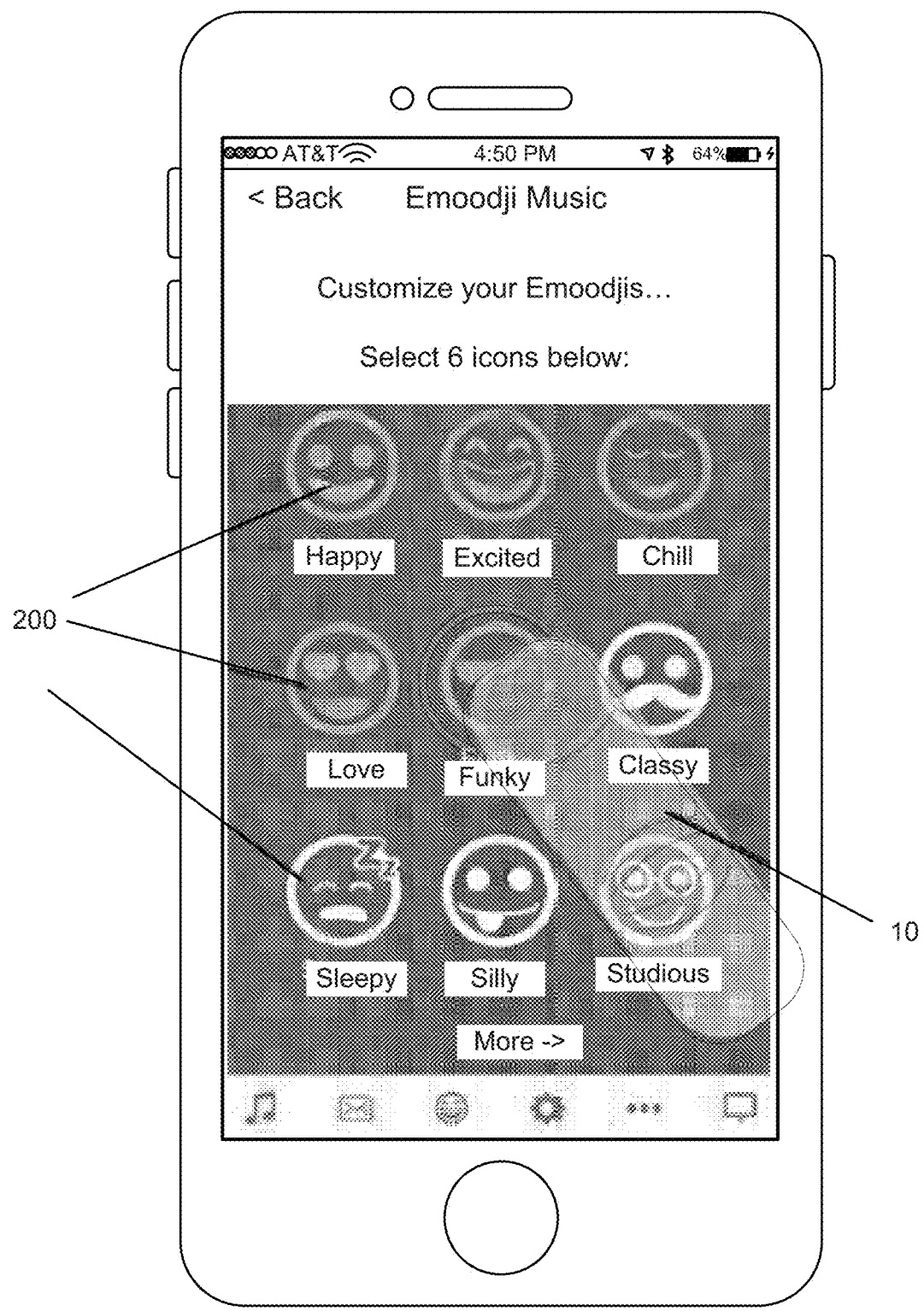
FIG. 4 displays the icons used to signify emotions.

3. Next, the user 10 will select their preferred moods by choosing the associated icons 200 or Emojis (called Emoodjis as used in the current invention) that represent these moods (e.g. Happy, Energetic, Chill, Angry, etc.) as shown in FIG. 4. These Emoodjis 200 will be chosen from a set of preloaded icon options. In the preferred embodiment, the user can purchase more Emoodjis 200 sets through a one-time purchase or through enrollment in a recurring payment plan for premium services.

Figure 5:
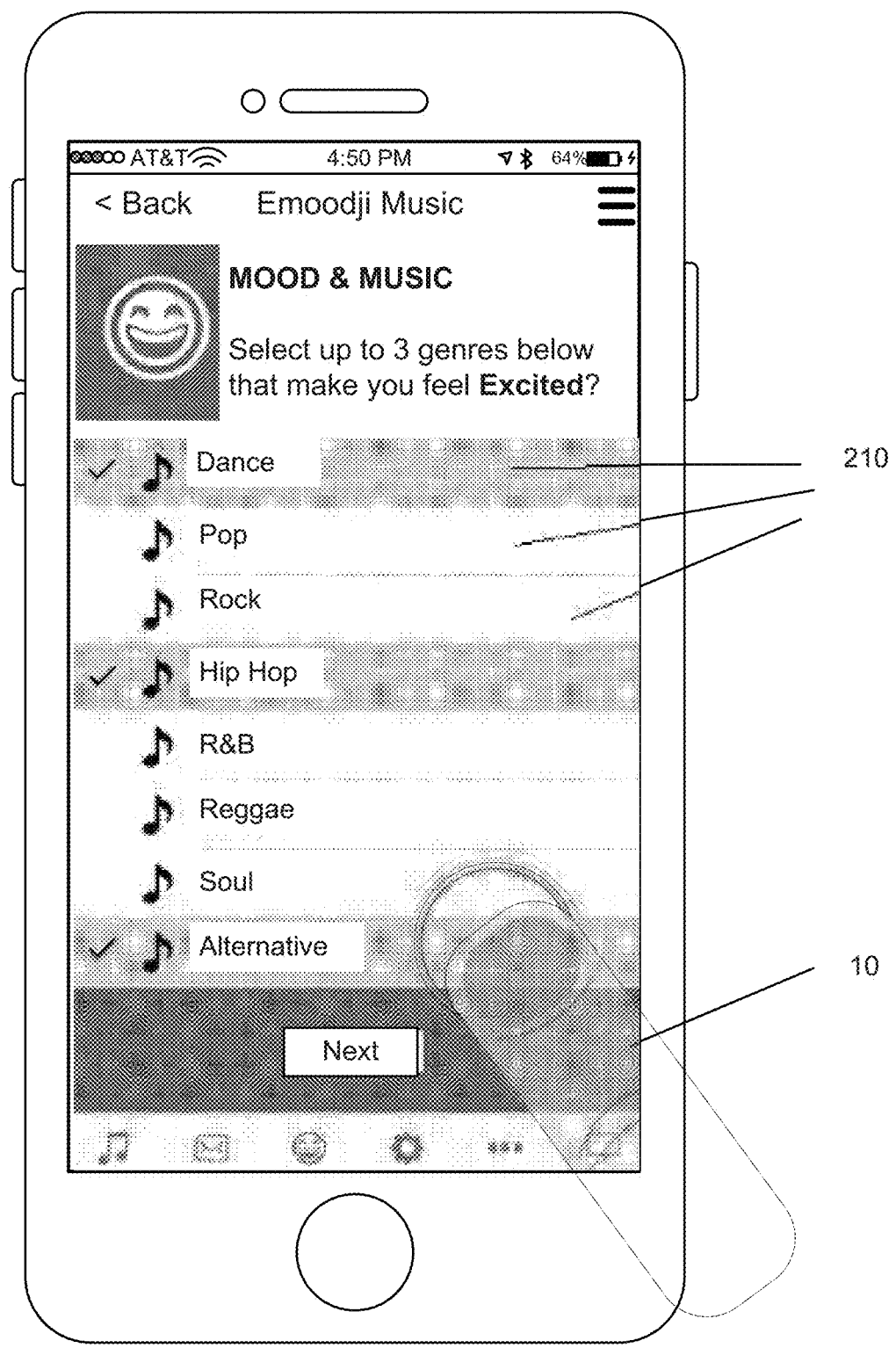
FIG. 5 display music being associated to the icon.

4. Finally, for each selected Emoodji, the user 10 will tell the system 1 which genres they listen to or watch or read, or what events they participate in when they want to feel those moods as shown in FIG. 5. The system 1 has artificial intelligence (AI) that is used to create a correlation between mood and music/video/literature/activity 210 for that particular user 10.

The user 10 can assign their desired mood icons 200 to an activity or event such as eating, movies, sporting events, dancing or any other activity or social event. This can be done as a standalone system or in combination with music, videos, and/or literature.

Music/Video/Literature/Event Generation

Figure 6:
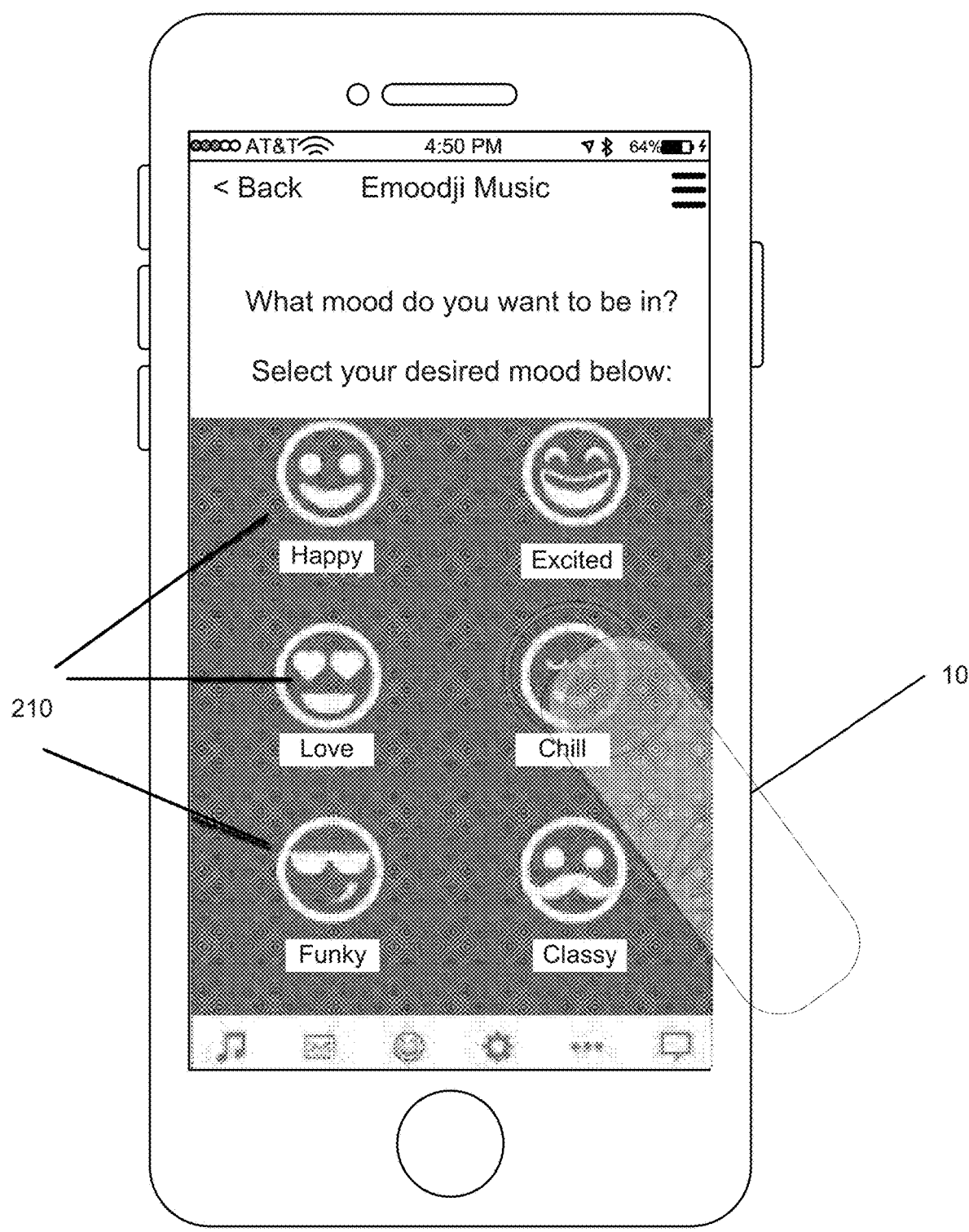
FIG. 6 displays a user choosing music based on their mood.

After the user 10 has selected their mood icons (Emoodjis) 200 and associated music video, and literature genres 210 or event with each mood (i.e. what music/video genres make them feel that particular mood), the system 1 in the preferred embodiment will have the following options would provide the user with music/video/literature/activity based upon their desired mood—i.e. after they select the Emoodji, the music/video/literature would come from one of the following: a Personal Music/Video/Literature Library, a Licensed Database, an Original Database, Original Compositions (AI) and Original Compositions (User) FIG. 6 shows a user 10 choosing music based on their mood or the mood that they want to be in.

The user 10 can match their existing music, video, and/or literature library on their mobile computing device such as a cell phone, tablet or computer 20 (e.g. including music, video, and or literature from a download music/video/literaturesite) with the system 1. The songs, videos, and literature 210 in database are tagged by genre. The user selects the mood by selecting the appropriate icon (Emoodji) onscreen, which is translated into a genre by the system's software programming algorithms, for example, Chill=Jazz, Soul, Blues.

Figure 7:
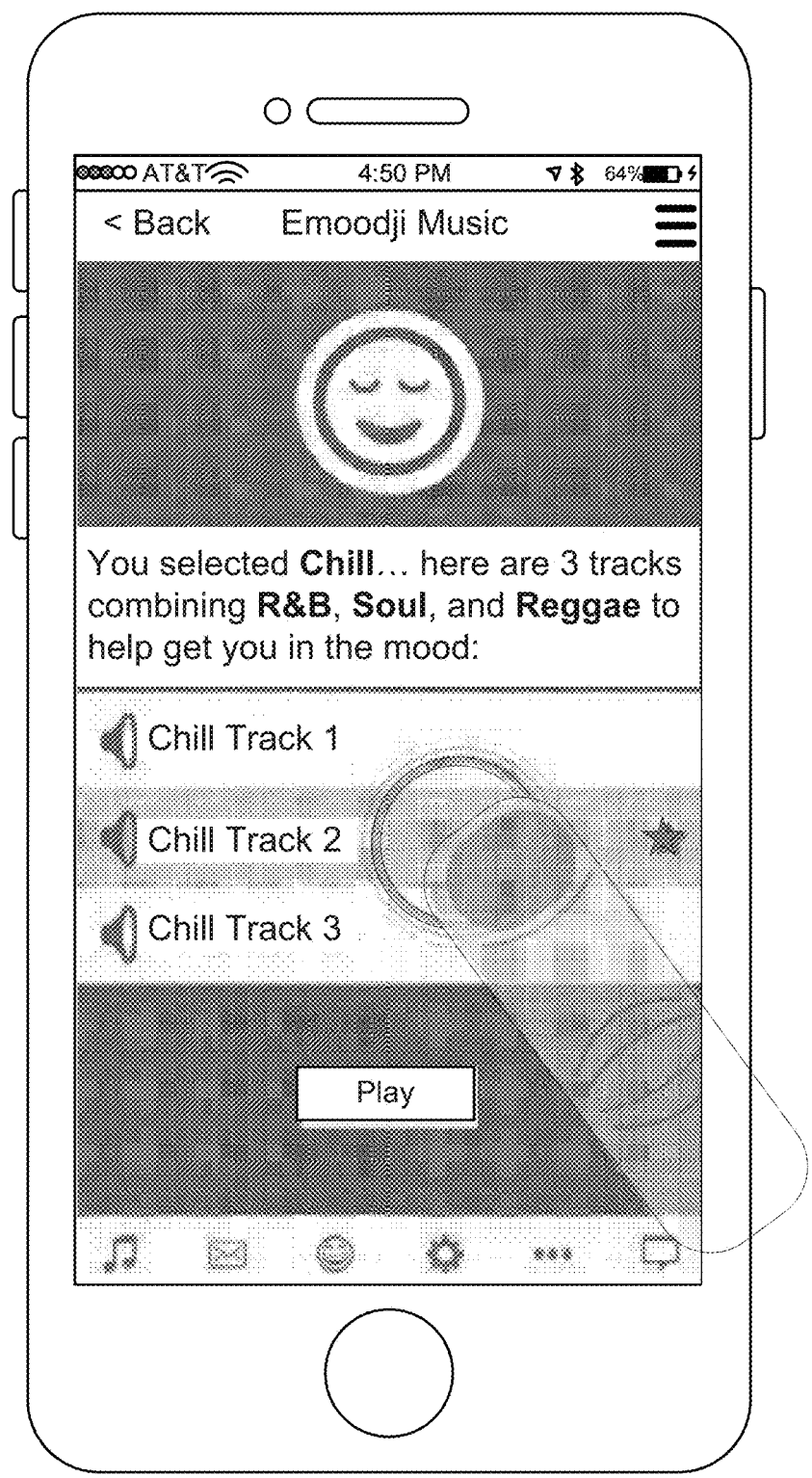
FIG. 7 shows a set of music tracks based on a mood.

The system 1 then searches for songs, videos, or literature in the user's music/video/literature library that are tagged with the appropriate genres. For example, the system 1 then provides a selection of songs that match the associated music genres, as determined by the user 10 as shown in FIG. 7. So the user 10 picks the Emoodji 200 associated with their mood or desired mood and the system 101 picks songs it associates with that mood.

Another option is for the system 1 to use a Licensed Database. A Licensed Database is an external database of songs/video/literature that have been licensed and archived via a centralized server. The songs in the music/video/literature library are tagged by genre 200. The user 10 selects the mood by selecting the appropriate icon 200 (Emoodji) onscreen, which is translated into a genre by the system's algorithms—for example, Chill=Jazz, Soul, Blues. In this example, the system searches for songs 210 in the licensed music/video database that are tagged with the appropriate genres 200. Next, the system 1 provides a selection of songs that match the associated music genres 200, as determined by the user 10.

The system 1 may also use an Original Database which is an external database of music/video/literature in non-transitory memory that have been created originally for the platform (i.e. rights to music/video/literature owned outright by the platform operators, via acquisition or work-for-hire) and archived via a centralized server. Again, the songs and videos 210 in the music/video library are tagged by genre. The user 10 selects the mood by selecting the appropriate icon 200 (Emoodji) onscreen, which is translated into a genre by the system's algorithms—for example, Chill=Jazz, Soul, Blues. The system 1 searches for songs or videos in the original music database that are tagged with the appropriate genres 200. The system 1 will provide a selection of songs or videos that match the associated music genres 200, as determined by the user 10.

The system 1 can create Original Compositions using its artificial intelligence (AI). The system's AI is programmed with music theory (i.e. what types of sounds, instruments, melodies, etc. are typical/inherent to certain genres). A database of "song parts" (i.e. instrumental components of a song—for example, drums, bass, guitar, horns, winds, strings, etc.) is established via a centralized server. The song parts in the music library are tagged by genre 200 (for example, certain drum tracks work best with hip hop, certain bass tracks work best with funk, certain horn tracks work best for jazz etc.). The user 10 selects the mood by selecting the associated Emoodji 200, which is translated into a genre by the system's programming algorithms—for example, Chill—Jazz, Soul, Blues. The system 1 searches for song parts in the music database that are tagged with the appropriate genres 200. The system 1 composes a variety of songs that fit the selected genre, using its programmed music theory together with the song parts found in the database. The system may add in video, in accordance with the selected mood and appropriate genre. The system then provides the songs or videos to the user 10. The user 10 can add additional song or video parts (tracks), as identified by the AI (i.e. fitting the selected genre).

Figure 8:
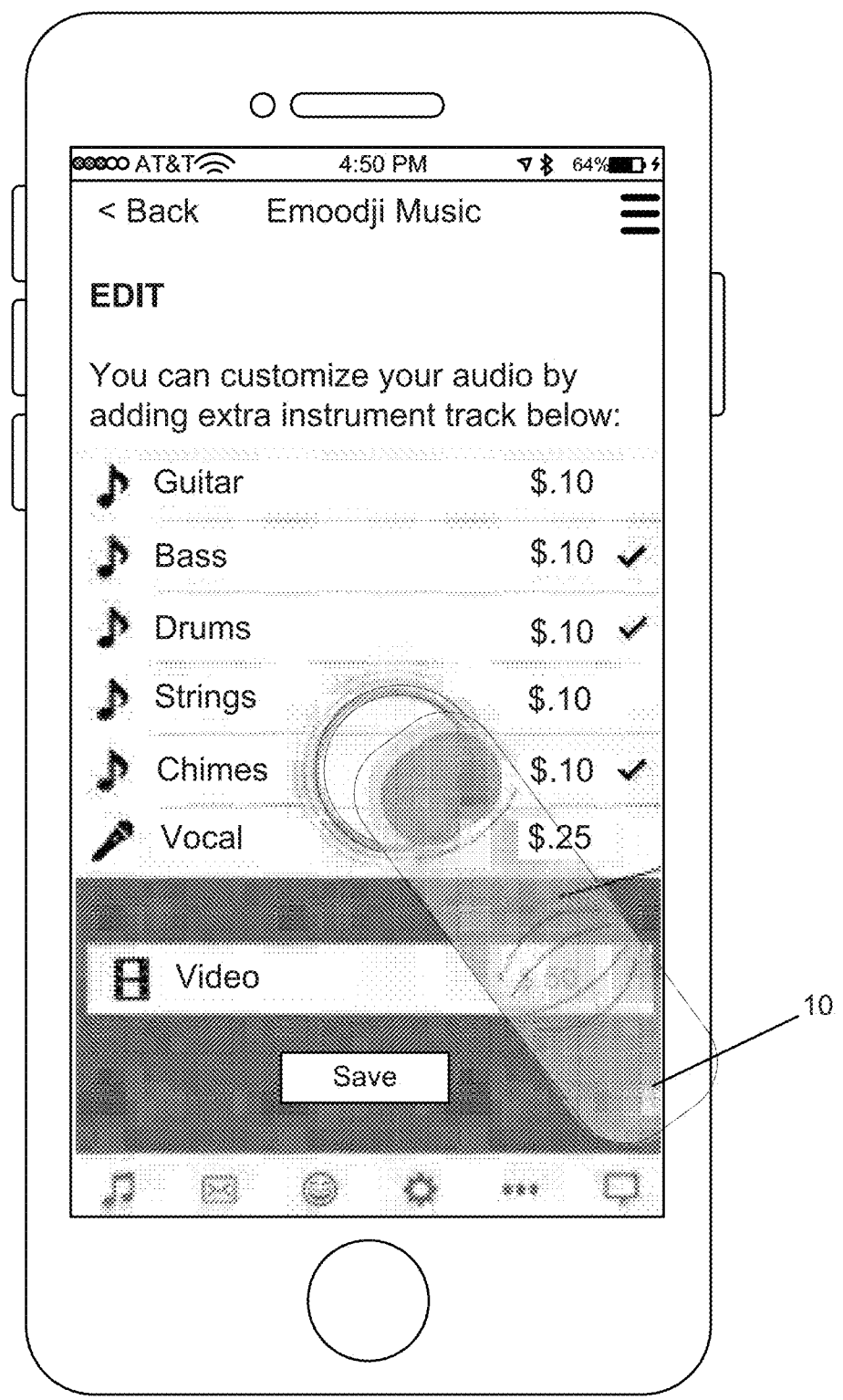
FIG. 8 displays the edit function of the system.

The system 1 can enable the user to create Original Compositions. The system's AI is programmed with music theory (i.e. what types of sounds, instruments, melodies, etc. are typical/inherent to certain genres 200). The system 1 has a database of "song parts" (i.e. instrumental components of a song—for example, drums, bass, guitar, horns, winds, strings, etc.) is established via a centralized server. The song or video parts in the music/video library are tagged by genre (for example, certain drum tracks work best with hip hop, certain bass tracks work best with funk, certain horn tracks work tor jazz, etc.). The user 10 selects the mood by selecting the associated Emoodji 200, which is translated into a genre by the software programming algorithms—for example. Chill=Jazz, Soul, Blues. The system 1 searches for song parts in the music database that are tagged with the appropriate genres 200. The system 1 provides the potential sang parts to the user, categorized by instrument as shown in FIG. 8. The user 10 selects a track for each possible instrument, as identified by the AI (i.e. fitting the selected genre 200). These selected tracks are then aggregated and used by the system 1 to create an Original Composition.

Music/Video/Literature/Event Editing

The system 1 would have Music and Video Editing. The user 10 will be able to edit the audio/video track provided by the system 1 as shown in FIG. 8. (this is inherently possible with the tracks originally composed within the app, or through licensing arrangements for prerecorded media).

Figure 9:
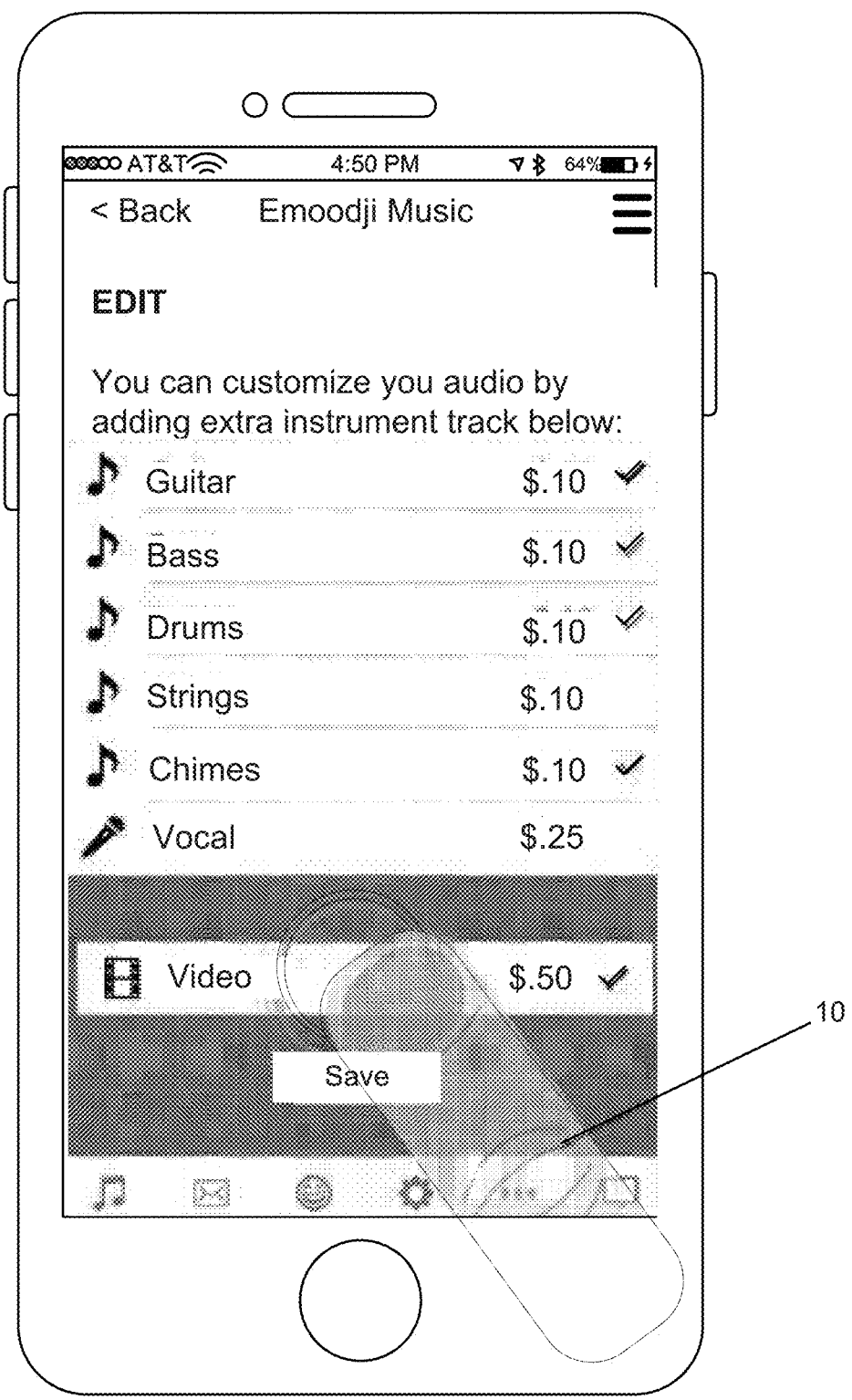
FIG. 9 displays the ability to add video to a file.

A user 10 will be given the option, to customize their music track by layering in a variety of additional instruments (e.g. guitars, drums, bass, strings, brass, etc.) for a fee as shown in FIG. 8. FIG. 9 shows where a video can be added to an audio track. For a video file, different video clips and editing options can be made to add to or modify the video. These video files may be related to the user's desired mood, as indicated by the selected Emoodji, and the associated video genre.

Figure 15:
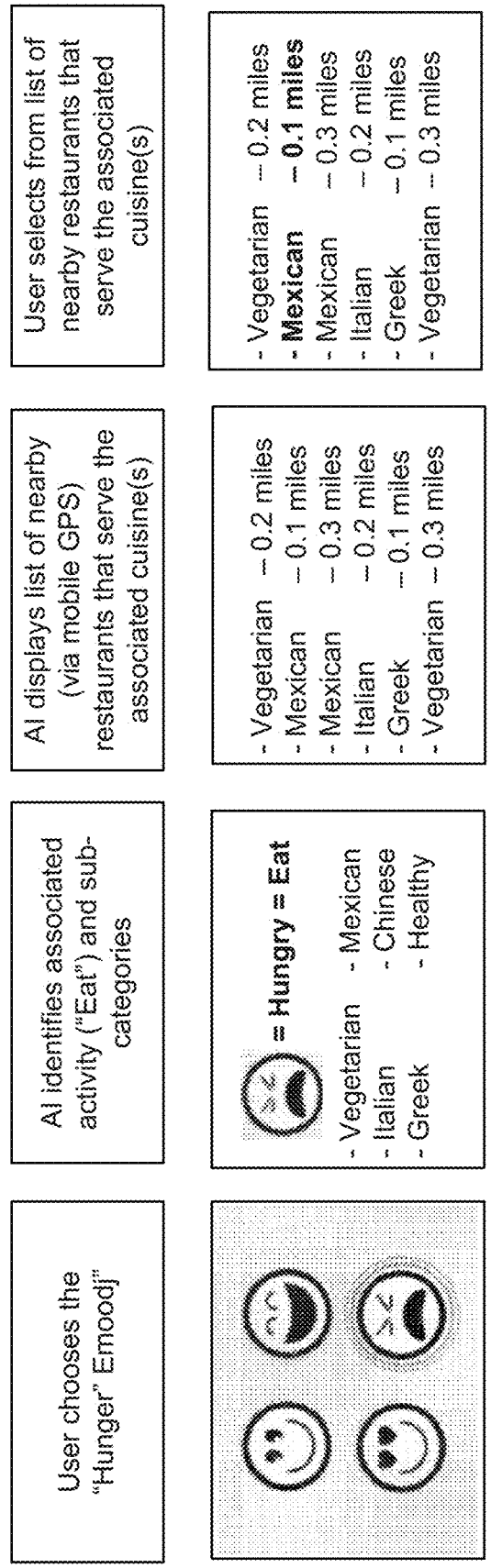
FIG. 15 displays the Activity/Event Process Recommendation Step.

After the system 1 recommends a restaurant based on the criteria to the user 10 can customize the choices as shown in FIG. 15. The user 10 can review the information provided by the system about the recommended restaurants. The user 10 can choose one of the recommended restaurants or ask for another suggestion, they can choose a reservation rime and date, secure their sitting and have the system 1 add the event to their calendar. The system 1 can have its own calendar function or can interface with a users calendar application.

Sharing/Collaboration

The system 1 would allow for social interactions (e.g. sharing and collaborations) through one or more of the following options: In-App Messaging (Text), In-App Messaging (Voice) or third-party (i.e. installed) Keyboard.

Figure 13:
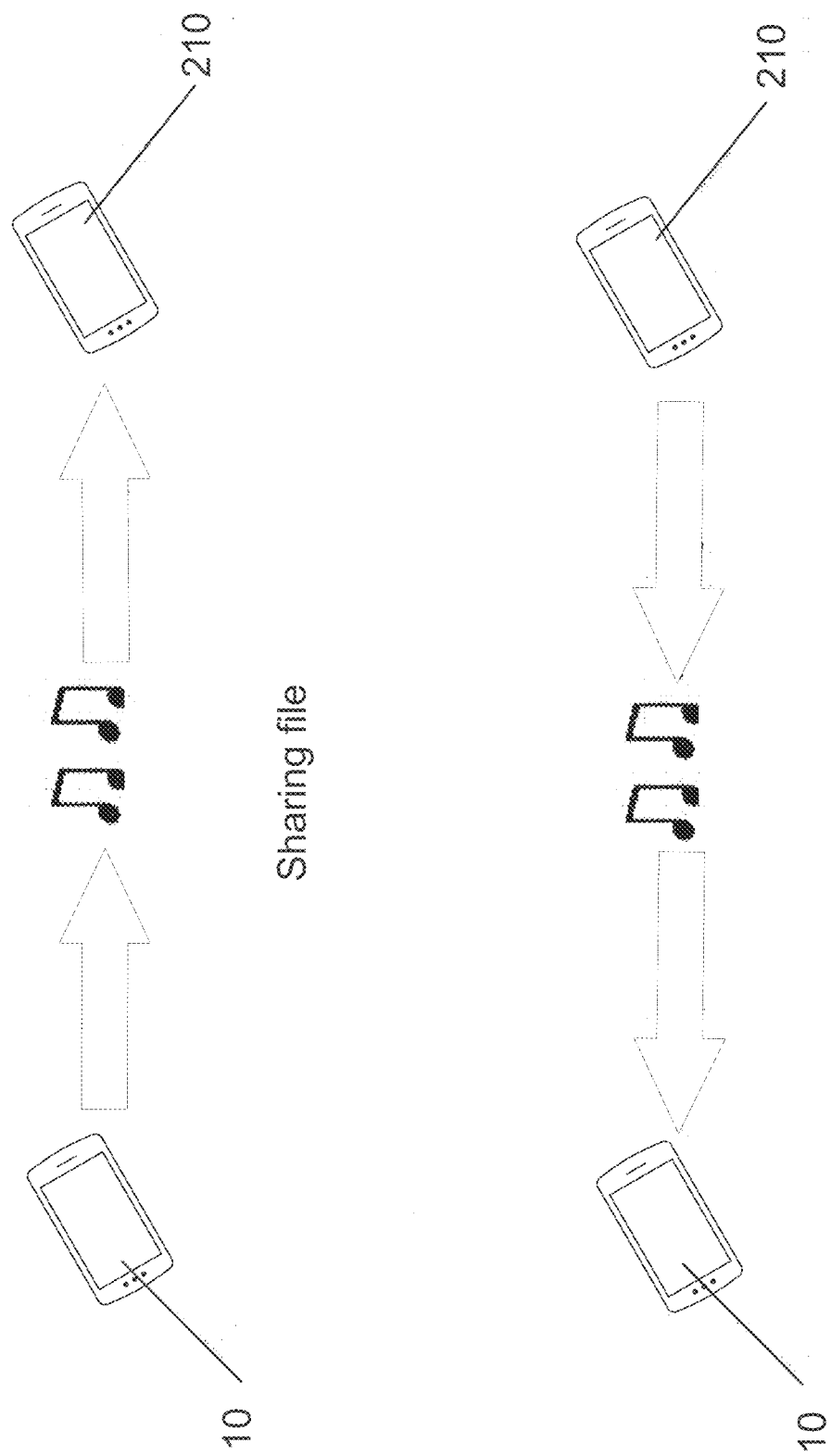
FIG. 13 shows the sharing of an audio file.
Figure 14:
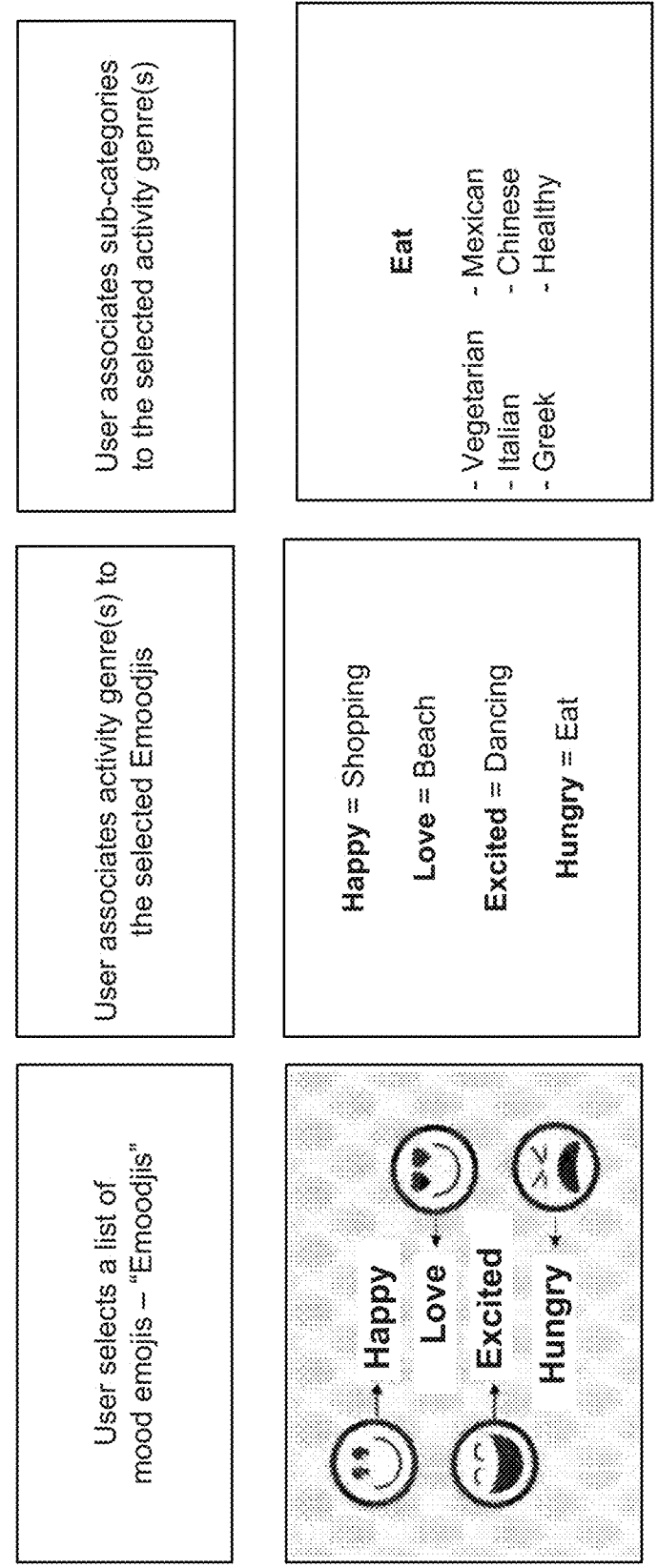
FIG. 14 shows Activity/Event Process Profile Creation.

The system 1 can enable multiple users to contribute to a single song, video, or literature (or piece of multi-media content), as each user 10 can add to the literature, audio track of video clip, share it with other users, and repeat this process until the literature, audio or video clip is finalized as shown in FIG. 13. This contribution and editing can occur many times.

Figure 10:
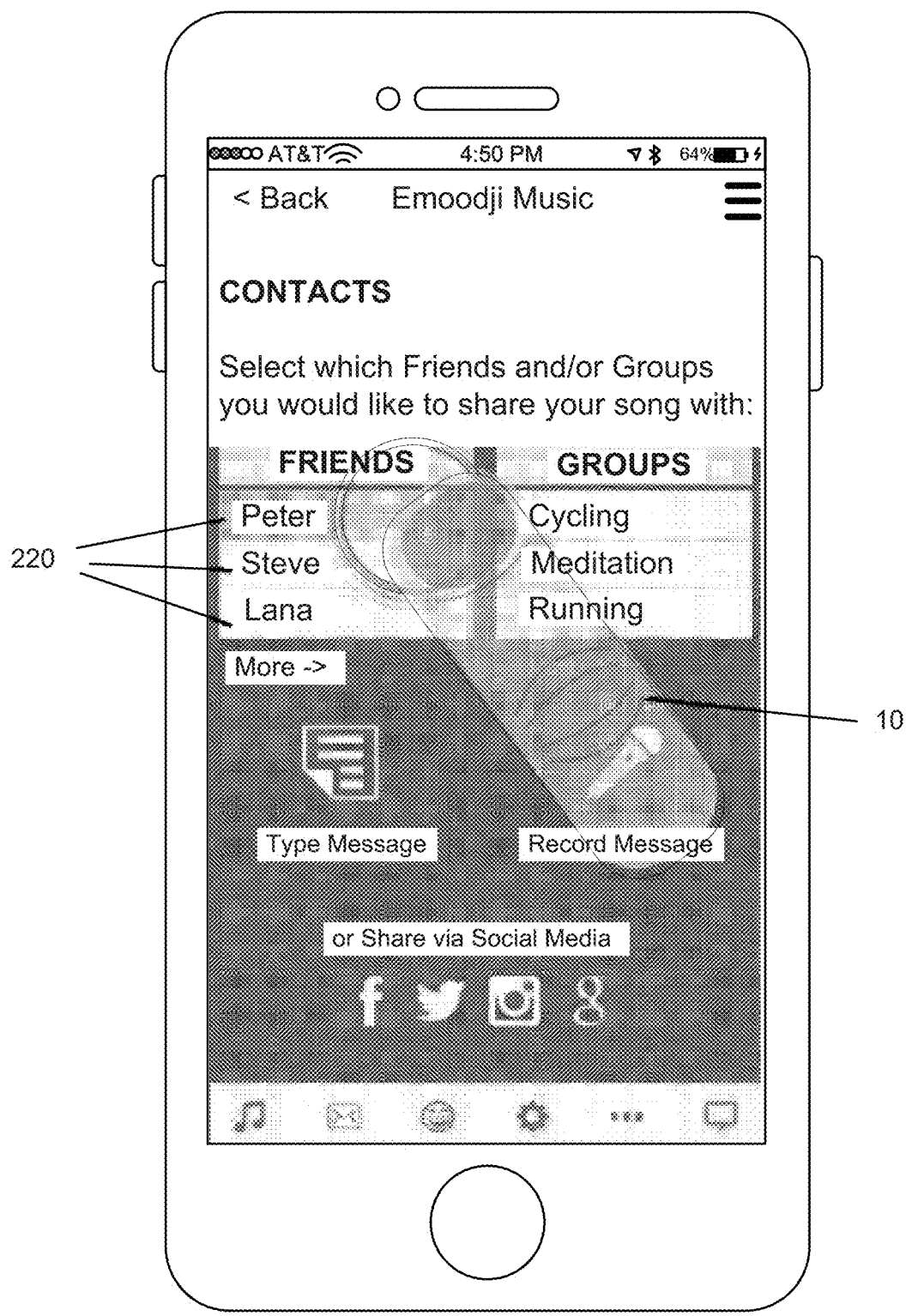
FIG. 10 displays sharing of the file with others.
Figure 11:
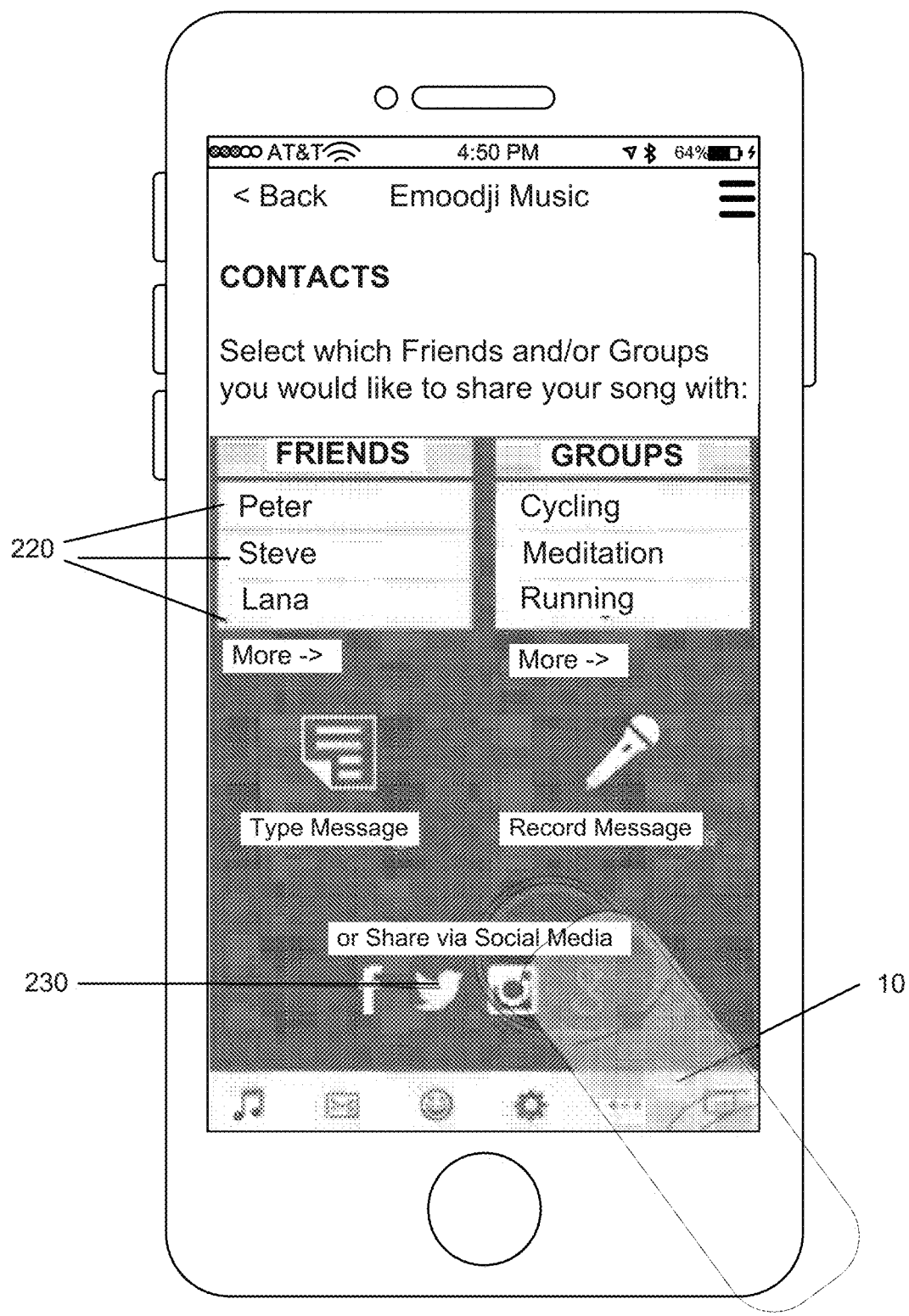
FIG. 11 shows the system sharing a file through social media.

As shown in FIG. 10, the audio/video/literature files can be sent and shared through a number of means such as In-App Messaging (Text). The user 10 creates multi-media content (or MMC), which can contain music, video, voice, graphics, etc. The user 10 selects 'Share' from within the system 1. The user 10 selects the desired recipients (individuals and/or groups) 220. The user 10 selects the 'Text/Type/Message' option. The user 10 can write an original message in a test entry field. The user saves the text message. The message is added to the MMC prior to sending it to the selected recipient(s) 220. The user 10 chooses the social media hyperlink to send it on as shown in FIG. 11.

Figure 12:
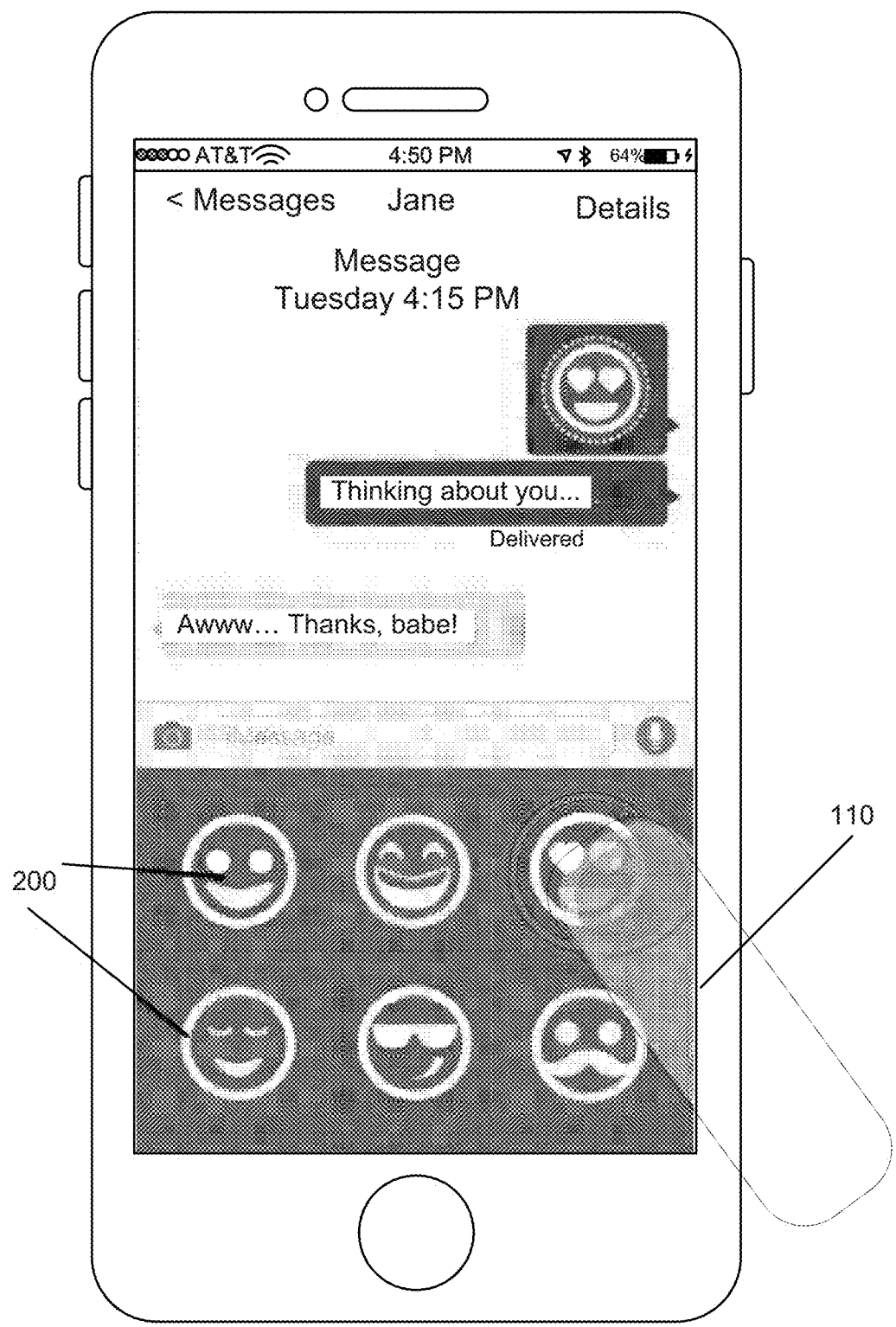
FIG. 12 shows a recipient receiving a message with a file.

When the recipient receives the message, they click an Emoodji 200 to play the MMC as shown in FIG. 12.

The system 1 has In-App Messaging (Voice). The user 10 creates MMC. The user 10 selects 'Share' from within the system screen as shown in FIG. 10. The user 10 selects the desired recipients 220 (individuals and/or groups). The user 10 selects the 'Recording/Voice' option. The user can create an original message via an audio/video recording. The user 10 saves the message. The message is added to the MMC prior to sending it to the selected recipient(s) 220. When the recipient 110 receives the message, they click an Emoodji 200 to play the MMC as shown in FIG. 12.

The user 10 can install a third-party Keyboard that features Emoodjis as the keys instead of traditional alphanumeric characters, as described below. The user 10 creates an MMC and saves their MMC to their Archive. The user 10 installs the Emoodji Keyboard app to their device. The keyboard can feature the Emoodjis selected by the user 10, or a variety of popular or common Emoodjis. This keyboard would act in a manner similar to animated GIF keyboards or meme keyboards, where the user 10 can search for an image by typing the theme into a search bar. With this app, the user presses the Emoodji 200 to select the associated mood/theme. The user 10 can access the Emoodji Keyboard from any text conversation—Chats, Direct Messages, Twitter®, etc. The user 10 selects an Emoodji, triggering one of the following events to occur: the AI searches the recipient's music library to play a music/video/literature track tagged with the selected mood/theme (i.e. genre), the AI searches the recipient's Archive of Original Compositions to play a track tagged with the selected mood/theme (i.e. genre); or the user sends the Emoodji 200 to the recipient 110, which is hyperlinked to the app—upon pressing the Emodji 200 in the text conversation, the AI is triggered to search the centralized (i.e. cloud-based) song parts database and composes a new Original Composition on the recipient's device. It is also possible for the AI to search the song/video/literature parts database and compose an original work on the user's device first, before sending it to the recipient.

Figure 16:
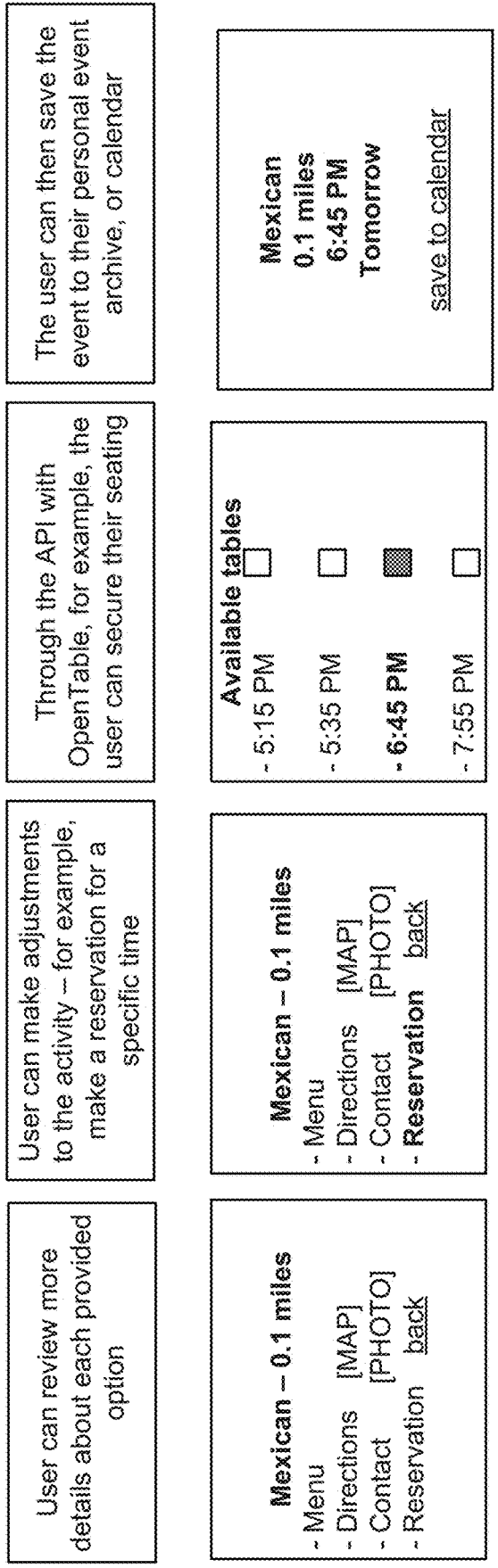
FIG. 16 displays the Activity/Event Process Customization Step.
Figure 17:
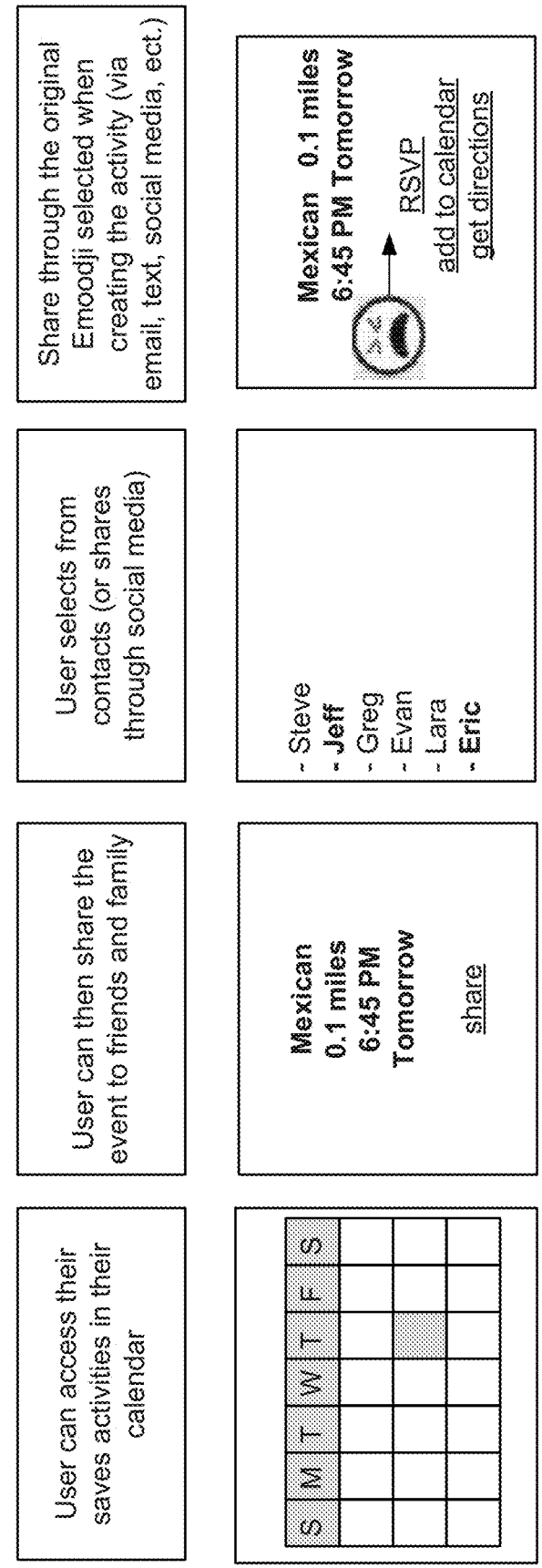
FIG. 17 displays the Activity/Event Process Sharing Step.

As shown in FIG. 16, the User 10 can access their saved activities in their calendar. The user 10 can then share the event/activity to friends and family. The User 10 can select from contacts (or shares through social media) people that they want to share the event with. The system 1 can share through the original Emoodji selected when creating the activity (via email, text, social media, etc.). The people the system 1 shares with can confirm their the system 1 or through other confirmation means such as social media or phone call or text. The people the system 1 shares with can also have input to the event or suggest changes to the event.

Any activity or event can be shared this way.

Operation

The current invention can work as an Audio/Video/Literature/Media Standalone App where the:

1. User 10 selects moods by choosing from preloaded icon options (these can be customized by the user later), 2. User 10 selects genre(s) of that media (i.e. audio, video, literature, or combination) that they associate with each mood, and 3. User 10 selects mood via Emoodji; AI chooses appropriate genre option(s) that match that mood (based upon user's input in Step 2).

The current invention can also work as an Activity/Event Standalone App having new material to include activities and events in addition to media where the:

1. User 10 selects moods by choosing from preloaded icon options (these can be customized by the user 10 later), 2. User 10 selects activities (i.e. eating, shopping, hiking, reading, etc.) that they associate with each mood, and 3. User 10 selects mood via Emoodji; AI chooses appropriate activity option(s) that match that mood (based upon user's input in Step 2).

In activity pairing (i.e. matching mood to event, or Step 2 above), the user 10 selects moods, then actions—or they can select favorite actions, and then assign one mood each to those actions.

The system 1 can be an Integrated App—or General Items of Interest—where the:

1. User 10 selects moods by choosing from preloaded icon options (these can be customized later), 2. User 10 select items from a variety of categories that they associate with each mood, including music genres, specific bands, movie genres, specific movie titles, book genres, specific hook titles, food, activities, events, etc., and 3. User 10 selects mood via Emoodji; AI chooses appropriate option(s) that match that mood (based upon user's input in Step 2).

As user 10 engages with the app, AI learns what options the user 10 favors and which options user ignores; the AI then updates itself accordingly to make more favorable recommendations.

All of the above embodiments may be contained within one single software process, such as an app, or may be implemented in individual processes or apps, each designed to feature one or more form of specific features outlined above, whether it be music or video or activity, as well as a combination. Please note the system can also work with literary works and generation as well.

Conclusion

Although the present invention has been described in considerable detail with reference to certain preferred versions thereof, other versions are possible. Therefore, the point and scope of the appended claims should not be limited to the description of the preferred versions contained herein. The system is not limited to any particular programming language, computer platform or architecture.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for exchanging personalized media via a clickable image, the system comprising:

a processor configured to:

provide, to a user, a plurality of clickable images for a selection of the clickable image indicative of a mood;

receive, from the user, the selection of the clickable image;

receive, from the user, one or more selections of a media genre to be associated with the mood;

based on the one or more selections, associate the clickable image with the media genre;

match the media genre with media genres associated with a plurality of personalized media to select a personalized media associated with the media genre;

based on the matching, associate the clickable image with the personalized media;

receive, from the user, a request to modify the personalized media;

in response to the request, modify the personalized media, the modifying including creating a multimedia content based on the personalized media;

receive, from the user, a request to exchange the multimedia content with at least one recipient; and exchange the multimedia content with the at least one recipient by sending the clickable image to the at least one recipient, wherein upon clicking on the clickable image by the at least one recipient, the multimedia content is served to the at least one recipient; and a memory communicatively coupled to the processor, the memory storing instructions executable by the processor.

2. The system of claim 1, wherein the clickable image is sent using one or more of a messaging application and a third-party installed keyboard.

3. The system of claim 1, wherein the personalized media is modified after being associated with the clickable image.

4. The system of claim 3, wherein the modifying includes adding one or more of an instrumentation, a vocal, a sound bite, a video clip, and a custom content.

5. The system of claim 3, wherein the modifying is based on a suggestion made by an application running on a device associated with the user.

6. The system of claim 1, wherein the serving of the multimedia content to the at least one recipient includes displaying the multimedia content on a device associated with the at least one recipient.

7. The system of claim 1, wherein the processor is further configured to serve the personalized media to the user via a device associated with the user.

8. The system of claim 1, wherein the personalized media includes one of a music, a video, and literature.

9. A method for exchanging personalized media via a clickable image, the method comprising:

providing, to a user, a plurality of clickable images for a selection of the clickable image indicative of a mood;

receiving, from the user, the selection of the clickable image;

receiving, from the user, one or more selections of a media genre to be associated with the mood;

based on the one or more selections, associating the clickable image with the media genre;

matching the media genre with media genres associated with a plurality of personalized media to select a personalized media associated with the media genre;

based on the matching, associating the clickable image with the personalized media;

receiving, from the user, a request to modify the personalized media;

in response to the request, modifying the personalized media, the modifying including creating a multimedia content based on the personalized media;

receiving, from the user, a request to exchange the multimedia content with at least one recipient; and exchanging the multimedia content with the at least one recipient by sending the clickable image to the at least one recipient, wherein upon clicking on the clickable image by the at least one recipient, the multimedia content is served to the at least one recipient.

10. The method of claim 9, wherein the personalized media is located on one or more of a device associated with the user, a third party resource, and a cloud computing resource.

11. The method of claim 9, wherein the personalized media is selected dynamically from one or more of a personal music library, a personal video library, a personalized literature library, a licensed database, an original database, an original composition composed by the user, and an original composition composed using Artificial Intelligence (AI).

12. The method of claim 11, further comprising selecting the personalized media using the AI based on correlating of parameters of the personalized media and the media genre.

13. The method of claim 9, wherein the personalized media includes one of a music, a video, and literature.

14. The method of claim 13, wherein the music, the video, and the literature is selected based on the clickable image and the media genre associated with the clickable image.

15. The method of claim 9, wherein the clickable image includes one of an icon, an emotion, and an emoji.

16. The method of claim 9, wherein the personalized media is selected based on preferences of the user.

17. The method of claim 16, wherein the preferences of the user are obtained from a profile associated with the user.

18. The method of claim 16, wherein the preferences of the user are determined based on historic data associated with the user, the historic data including further personalized media previously served to the user.

19. The method of claim 9, further comprising serving the personalized media to the user via a device associated with the user.

20. A system for exchanging personalized media via a clickable image, the system comprising:

a processor configured to:

provide, to a user, a plurality of clickable images for a selection of the clickable image indicative of a mood;

receive, from the user, the selection of the clickable image;

receive, from the user, one or more selections of a media genre to be associated with the mood;

based on the one or more selections, associate the clickable image with media genre based on the mood;

match the media genre with media genres associated with a plurality of personalized media to select a personalized media associated with the media genre;

based on the matching, associate the clickable image with the personalized media;

receive, from the user, a request to modify the personalized media;

in response to the request, modify the personalized media, the modifying including creating a multimedia content based on the personalized media;

receive, from the user, a request to exchange the multimedia content with at least one recipient; and exchange the multimedia content with the at least one recipient by sending the clickable image to the at least one recipient, wherein upon clicking on the clickable image by the at least one recipient, the multimedia content is served to the at least one recipient, wherein the modifying further includes adding one or more of an instrumentation, a vocal, a sound bite, a video clip, and a custom content, wherein the serving of the multimedia content to the at least one recipient includes displaying the multimedia content on a device associated with the at least one recipient; and a memory communicatively coupled to the processor, the memory storing instructions executable by the processor.

* * * * *